US010900582B2

(12) United States Patent
Kellicker et al.

(10) Patent No.: US 10,900,582 B2
(45) Date of Patent: Jan. 26, 2021

(54) HIGH VOLTAGE HIGH EFFICIENCY VALVE

(71) Applicant: Taco, Inc., Cranston, RI (US)

(72) Inventors: Robert Kellicker, Upton, MA (US); Richard F. Brindamour, Jr., Cranston, RI (US); Robert J. Carreiro, Swansea, MA (US)

(73) Assignee: Taco, Inc., Cranston, RI (US)

( * ) Notice: Subject to any disclaimer, the term of this patent is extended or adjusted under 35 U.S.C. 154(b) by 179 days.

(21) Appl. No.: 15/714,716

(22) Filed: Sep. 25, 2017

(65) Prior Publication Data

US 2018/0216746 A1    Aug. 2, 2018

Related U.S. Application Data

(60) Provisional application No. 62/398,979, filed on Sep. 23, 2016.

(51) Int. Cl.
| | |
|---|---|
| *F16K 27/02* | (2006.01) |
| *H02P 7/03* | (2016.01) |
| *G05D 23/19* | (2006.01) |
| *F16K 43/00* | (2006.01) |

(52) U.S. Cl.
CPC ........ *F16K 27/029* (2013.01); *F16K 27/0236* (2013.01); *F16K 43/001* (2013.01); *G05D 23/19* (2013.01); *H02P 7/04* (2016.02)

(58) Field of Classification Search
CPC .. F16K 27/029; F16K 27/0236; F16K 43/001; H02P 7/04; G05D 23/19
USPC ........................................................ 318/280
See application file for complete search history.

(56) References Cited

U.S. PATENT DOCUMENTS

| | | | | |
|---|---|---|---|---|
| 4,364,111 A | * | 12/1982 | Jocz ....................... | G05B 19/23 251/129.11 |
| 4,491,775 A | * | 1/1985 | Harvey ................. | H02P 25/024 318/282 |
| 4,694,390 A | * | 9/1987 | Lee ..................... | G05B 23/0283 700/45 |
| 4,816,987 A | * | 3/1989 | Brooks ................. | F16K 31/046 137/487.5 |
| 5,059,879 A | * | 10/1991 | Watanabe .............. | G05B 19/23 318/603 |

(Continued)

*Primary Examiner* — Eduardo Colon Santana
*Assistant Examiner* — Devon A Joseph
(74) *Attorney, Agent, or Firm* — Sutton Magidoff Barkume LLP (57) ABSTRACT

A zone valve control system for a flow valve comprising a direct current rotary electric motor connected to a valve shaft, an electronic control system comprising a microprocessor, an electric measuring device for signaling the presence of a predetermined electrical stall current, a rectifier and a regulator to convert and regulate external AC voltage to a desired DC power output; and an electrical storage system having a total storage capacity sufficient to power the DC electric motor to move the valve between the closed and opened positions; an external sensor for signaling when a certain condition exists in an external zone; the microprocessor controlling the flow and polarity of DC current to the motor; whereby the electronic control system controls movement of a valve operably connected to the output shaft to open or close a valve to maintain a desired predetermined condition in the external zone.

9 Claims, 10 Drawing Sheets

(56) References Cited

U.S. PATENT DOCUMENTS

| | | | | |
|---|---|---|---|---|
| 6,274,993 | B1* | 8/2001 | Itabashi | H02P 7/04 |
| | | | | 123/361 |
| 6,822,409 | B2* | 11/2004 | Lange | G05B 19/042 |
| | | | | 318/434 |
| 8,084,982 | B2* | 12/2011 | Grabinger | F16K 31/046 |
| | | | | 318/561 |
| 8,473,229 | B2* | 6/2013 | Kucera | G01R 31/392 |
| | | | | 702/58 |
| 9,641,122 | B2* | 5/2017 | Romanowich | H02P 6/085 |
| 2002/0125847 | A1* | 9/2002 | Shimoyama | G05B 19/19 |
| | | | | 318/560 |
| 2006/0016427 | A1* | 1/2006 | Uda | F02D 11/106 |
| | | | | 123/399 |
| 2008/0143540 | A1* | 6/2008 | Savla | F16K 35/06 |
| | | | | 340/605 |
| 2010/0314458 | A1* | 12/2010 | Votaw | F24F 3/001 |
| | | | | 236/1 B |
| 2011/0062358 | A1* | 3/2011 | Kawamura | F16K 31/04 |
| | | | | 251/129.01 |
| 2011/0308619 | A1* | 12/2011 | Martino | F16K 3/0254 |
| | | | | 137/1 |
| 2013/0129527 | A1* | 5/2013 | Hamdan | F04B 49/02 |
| | | | | 417/43 |
| 2013/0131873 | A1* | 5/2013 | Hamdan | F04B 51/00 |
| | | | | 700/282 |
| 2015/0362236 | A1* | 12/2015 | Jiang | F25B 41/062 |
| | | | | 137/12 |
| 2018/0273013 | A1* | 9/2018 | Niglas | B60T 8/885 |

\* cited by examiner

FIG. 3
SECTION A-A

FIG. 9
ZONING WITH ZONE VALVES

HIGH VOLTAGE HIGH EFFICIENCY VALVE

The present invention relates to a high voltage zone valve.

BACKGROUND OF THE INVENTION

Current high voltage zone valves use a synchronous motor and a return spring. In the synchronous motor design, the motor is used to open the valve and a tensed return spring is used to close the valve. The use of a constantly tensed return spring to close the valve, requires that to maintain the valve in the open position a voltage must be constantly applied to the motor the entire time the valve is open. Constantly maintaining a stall current on and running through the motor while the valve is open, makes this energy inefficient. The other disadvantage of this design is that synchronous motors require a specific voltage, so that they cannot be used interchangeably when a different voltage is available.

Other types of zone valves include the use of a small shaded-pole synchronous motor combined with a rotary switch that can disconnect the motor at either of the two stopping points ("valve open" or "valve closed"). In this way, applying power to the "open valve" terminal causes the motor to run until the valve is open while applying power at the "close valve" terminal causes the motor to run until the valve is closed. The motor is commonly powered from the same 24 volt AC power source that is used for the rest of the control system. This allows the zone valves to be directly controlled by low-voltage thermostats and wired with low-voltage wiring. This style of valves requires the use of an SPDT thermostat or relay.

The disadvantage of both of the above designs is that synchronous motors require a specific voltage, so that they cannot be used interchangeably when a different voltage is available, for example different motors must be used in Europe or parts of South America, or industrial locations in the U.S., than can be used in residences in the U.S.

BRIEF SUMMARY OF THE INVENTION

A high voltage zone valve motor and its control system according to the present invention provide a highly efficient and effective control over the conditions in an enclosed environment, such as a commercial or residential building having multiple zones requiring different conditions determined by the flow of fluid to each of the zones.

The control system comprises a direct current rotary electric motor having a connection to a at least two sources of DC current having opposite polarities, and an output shaft, the motor being preferably of the brushed type. The polarity of the DC current powering the motor determines the direction of rotation of the output shaft. The system is controlled by an electronic control system comprising a microprocessor for controlling the connection between the electric motor and the source of DC current, an electric measuring device capable of measuring an electric current passing to the motor, and further capable of sending a signal to the microprocessor, and one or more rechargeable electrical storage systems having a total storage capacity sufficient to power the DC electric motor to fully open or close the valve; the rechargeable electrical storage systems being capable of receiving and storing DC current and to discharge such current to the motor having a reverse polarity from the polarity of the power from the external source of DC current.

Such storage systems can include, for example, storage capacitors and rechargeable batteries, such as a rechargeable battery bank used as an uninterruptible power supply in a data center including: Lead acid batteries, Nickel-cadmium batteries, Nickel-metal hydride battery (NiMH), Lithium-ion battery, Lithium-ion polymer battery, Flow battery, including Vanadium redox battery, so-called Supercapacitors, and UltraBatteries. Other potentially useful systems can include Superconducting magnetic energy storage (SMES) systems, which store energy in a magnetic field created by the flow of direct current in a superconducting coil that has been cooled to a temperature below its superconducting critical temperature. A typical present day SMES system includes a superconducting coil, power conditioning system and refrigerator, which makes it very difficult to be useful in the present system; as new materials are developed the need to cool the coil may be diminished to the point that a refrigerant system may no longer be necessary.

The microprocessor is capable of receiving and processing electrical signals from an external sensor for signaling when a certain condition exists in an external zone, and from the electric measuring device signaling that a predetermined electrical stall current is flowing through the motor. The microprocessor designed to control the flow and polarity of DC current to the motor when a predetermined signal is received from the sensor located in a given zone, that a predetermined condition exists in the external zone in order to move the valve in a first direction to open the valve to change the condition in the zone, or to reverse the polarity of the current upon receiving a signal that a desired condition exists in the external zone, so as to cause the motor to turn the shaft of the valve in the reverse direction to close the valve. Examples of conditions that can be controlled include, for example, temperature or humidity in the atmosphere of a closed environment, or the concentration of an e.g., reagent, in a liquid or gaseous system. When the valve is no longer able to move, such as when it is fully opened or closed, a predetermined signal indicating a stall current can be received from the electric measuring device, causing the system to shut off the current flow to the motor.

The system of this invention is preferably operated using source voltages ranging from 90 to 277 VAC and input frequency ranges from 45-65 Hz. This is possible because the high voltage zone valve DC motor is preferably a brushed DC motor, used to open and close a valve. This system is sensitive to the existence of a stall current when the valve is fully open or closed, so that the valve can move no further, shutting off the current to prevent burn out. It further provides for reversing the polarity of the current when the system is next activated, so that the valve is moved to the opposite position, i.e., from open to closed or from closed to open, because reversing polarity reverses the direction of rotation of the motor shaft and thus the valve shaft. Otherwise, the motor remains off, and no current flows to the motor, until the valve needs to be turned to the other position.

When the control system for the high voltage zone valve motor of this invention receives a signal from, e.g., a thermostat, indicating that a predetermined desired temperature condition exists in the enclosed environment, it closes a circuit between the DC motor and the electrical storage system, which causes the motor to operate in the reverse direction so as to close the valve. When the control system for the high voltage zone valve motor receives another signal from, e.g., the thermostat, it closes the electrical circuit to the motor, causing the motor to open the valve and, preferably to recharge the storage system, e.g., the capacitors, until it receives a further signal indicating, for example, that the desired external condition has been reached, and the storage system is adequately recharged. The stored energy can be available, for example, from storage capacitors, which are connected to the motor so that the polarity of the voltage to the motor is the reverse of the opening voltage and current flow, thus causing the motor to reverse direction so as to close the valve. Once the valve is closed, and can move no further, the motor is stopped until the control system signals that it must again re-open the valve, so that the flow through the zone valve can recommence. It is also useful to operate the valve system in reverse, so that the valve is opened utilizing the power from the storage system, and the valve is closed by allowing current flow from the primary power line.

This invention may be used, for example, in hydronic heating and cooling applications where an electronic control is provided to operate the valve motor so as to cause the valve to open and close on a signal from, e.g., a thermostat sensor. Other systems in which it could be useful involve maintaining a desired humidity, maintaining a desired concentration of a reagent in a system, or a liquid level in a reservoir, where the sensor is a depth sensor. The particular sensor chosen depends upon the system and thing being measured. It is only necessary that the sensor send an electrical signal based upon the desired measurement.

DETAILED DESCRIPTION OF THE INVENTION

Hereinafter, embodiments of the invention will be described in detail with reference to the accompanying drawings, and the details necessary for those skilled in the art to understand the contents of the invention will be described in detail. However, the invention may be embodied in many different forms within the scope of the appended claims, so the embodiments described below are provided merely as examples.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Due to the ubiquity of central heating and cooling systems in our society, the embodiment of this invention being exemplified below is an HVAC system for heating and cooling a large building having multiple temperature zones.

It should be understood that the particular electronic systems shown are merely exemplary and that persons skilled in the art of designing electronic systems can readily design other combinations of individual elements to achieve the same electronic connections, without departing from the basic development of this system. That is the reversal of electric polarity in successive electrical empowering of the system to avoid the use of biasing means, which in turn require the maintaining of 'power on' at all times to maintain a desired position of the valve, as opened or closed.

In operation, as shown in the drawings, the motor 8 is powered by DC current which is converted from available converted AC current through rectification from a high voltage power supply, such as a residential or available commercial wall socket commonly available, and having a voltage in the range of from 90 to 277 volts AC and a frequency in the range of 45 to 65 Hz. When the motor 8 is powered, it turns gear 20 attached to the shaft of the motor which in turn operates the large-toothed circular gear 6, which in turn operates the second round-toothed gear 7, which in turn moves the triangular sector gear 5, causing rotation of shaft 4 which is connected to the valve stem shaft 22 of the valve body 15. The valve stem shaft 22 in turn moves the valve body between the open and closed positions, depending upon the direction of rotation of the motor shaft 20. The angular limit of rotation can be preset by selecting a suitable triangular gear to match the angle of rotation of the valve between the open and closed positions.

When the valve reaches the fully open position, causing the current to change to a preset 'stall current', because further movement is mechanically blocked, the signal from the electrical sensor in turn causes the motor current to be terminated by the control microprocessor, and the valve to remain in the open condition until such time as the current is reconnected, all by operation of the electronic control board 26. The fully closed and fully opened positions of the valve are sensed by an ammeter tuned to react to the 'stall' current, which occurs when shaft 4 is pushed against its stop and can move no further. Opening of the valve, by reversing the direction of rotation of the motor shaft, is accomplished either manually by an operator, using the knob 10, or by a sensor programmed to respond to a change of some parameter of the system that will require flow through the valve.

As explained above, there is no biasing means pulling the valve to the closed, or open, position. This allows the power to the motor to be shut off completely, in both the open and closed valve positions, unlike the prior art systems where the valve was biased, commonly towards the closed position, such that the motor was required to be always on, in the open valve position, to act against the spring bias action.

As part of the power saving system, the motor is operated to close the valve, by the electrical energy stored when current was on, e.g., during the opening action. The power storage means can include, for example one or more storage capacitors, or storage batteries, which can be charged while external power is present. The storage capacitors are charged during or prior to opening the valve by DC current, converted from the generally available external AC power.

In the Examples shown in the drawings herewith, there are two storage capacitors C1 and C7, each having a rating of 6.0 Farads and 2.5 Volts. As the capacitors are in series, the voltages of the two capacitors are additive so that they provide 5 Volts to the motor.

The valve is ultimately controlled, as regards opening and closing, by a sensor measuring an external condition. In the case of a heating or cooling system, the external condition is the temperature of the space being heated or cooled. The thermostatic sensor sends a signal to a switch that closes a circuit between the high voltage power supply or the storage capacitors, and the motor, to provide electrical power to the motor to re-open the zone sentry valve if the zone to be, e.g., heated, falls below the desired pre-set temperature, or to close the zone sentry valve when the desired pre-set temperature is reached.

Figure 1:
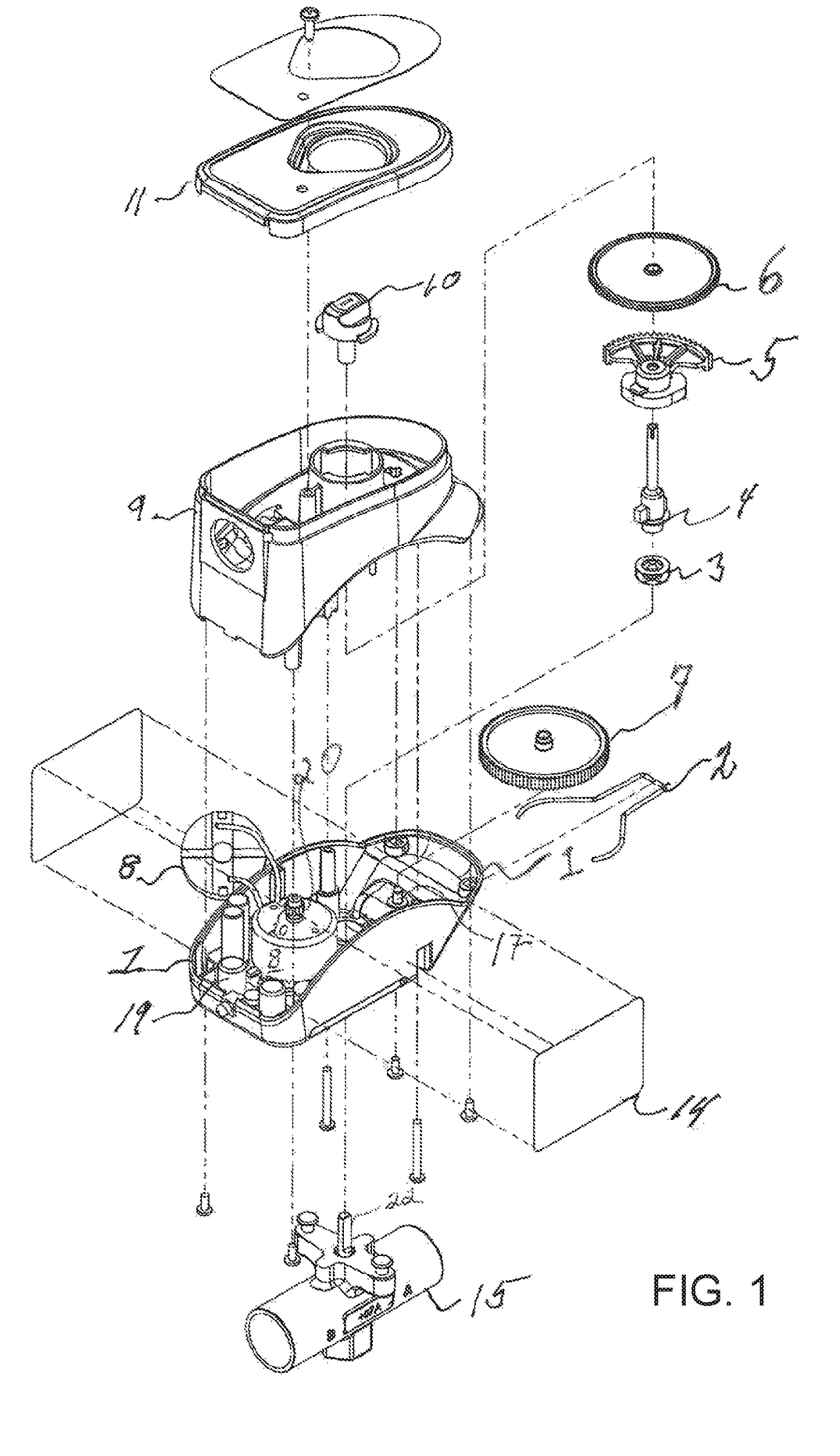
FIG. 1 is a perspective exploded view of a control system and valve according to the present invention.
Figure 2:
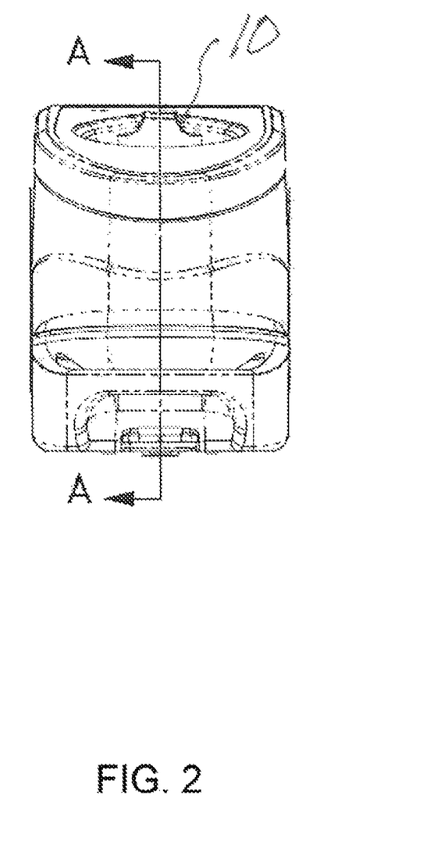
FIG. 2 is a front view of the product of FIG. 1.
Figure 3:
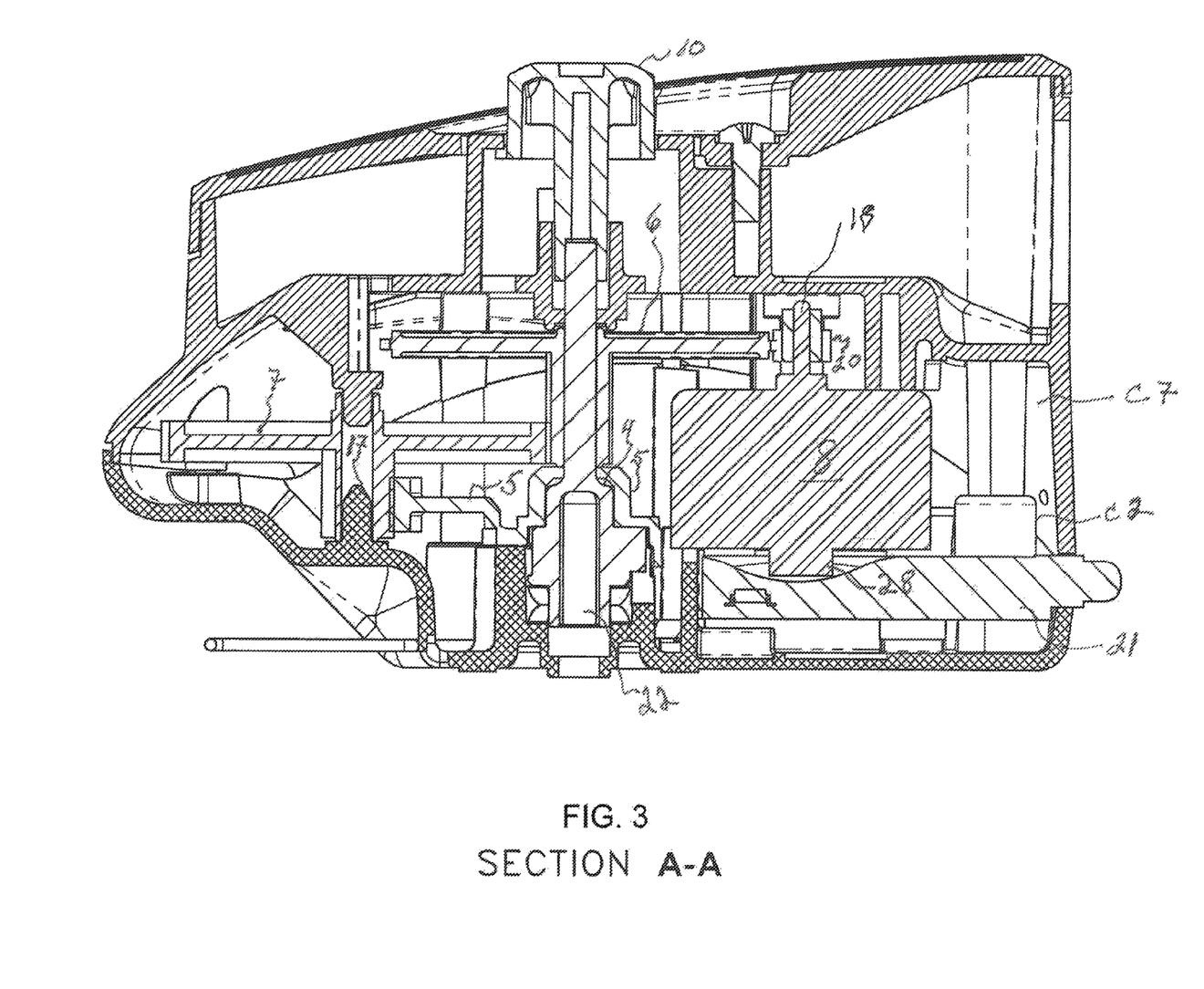
FIG. 3 is a cross section view taken along lines AA of FIG. 2 showing the internal mechanisms of the control system of FIG. 1.
Figure 4:
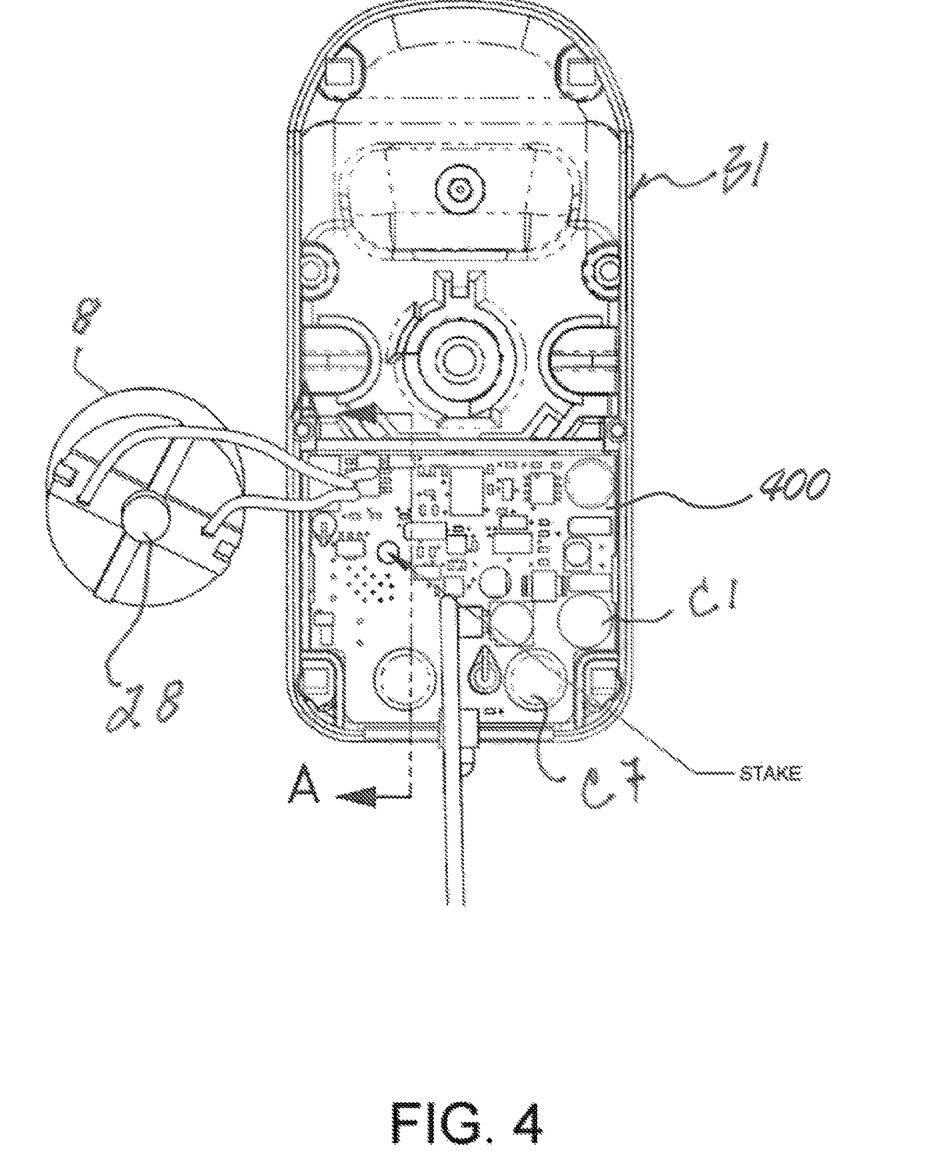
FIG. 4 is a partial perspective showing the placement of the motor above the electronic segment of the valve control system showing the internals from the top with the cover of the control system removed.
Figure 5:
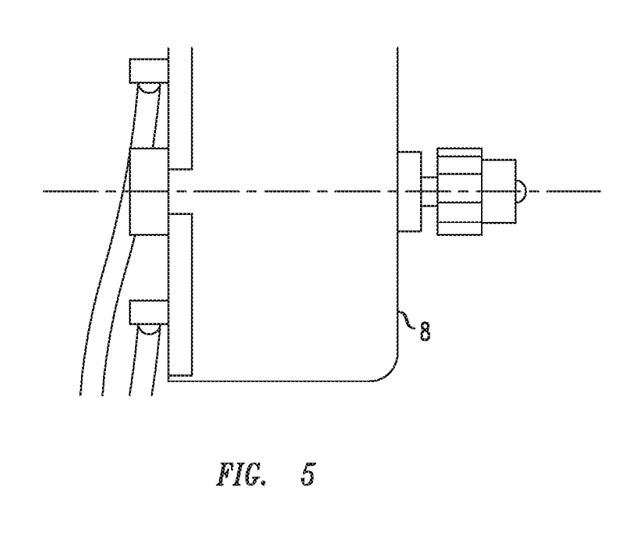
FIG. 5 is a side view of the electric motor operated by the control system for opening and closing the zone sentry valve showing electrical leads connected to the back of the motor from a commercial or residential power lead.
Figure 6A:
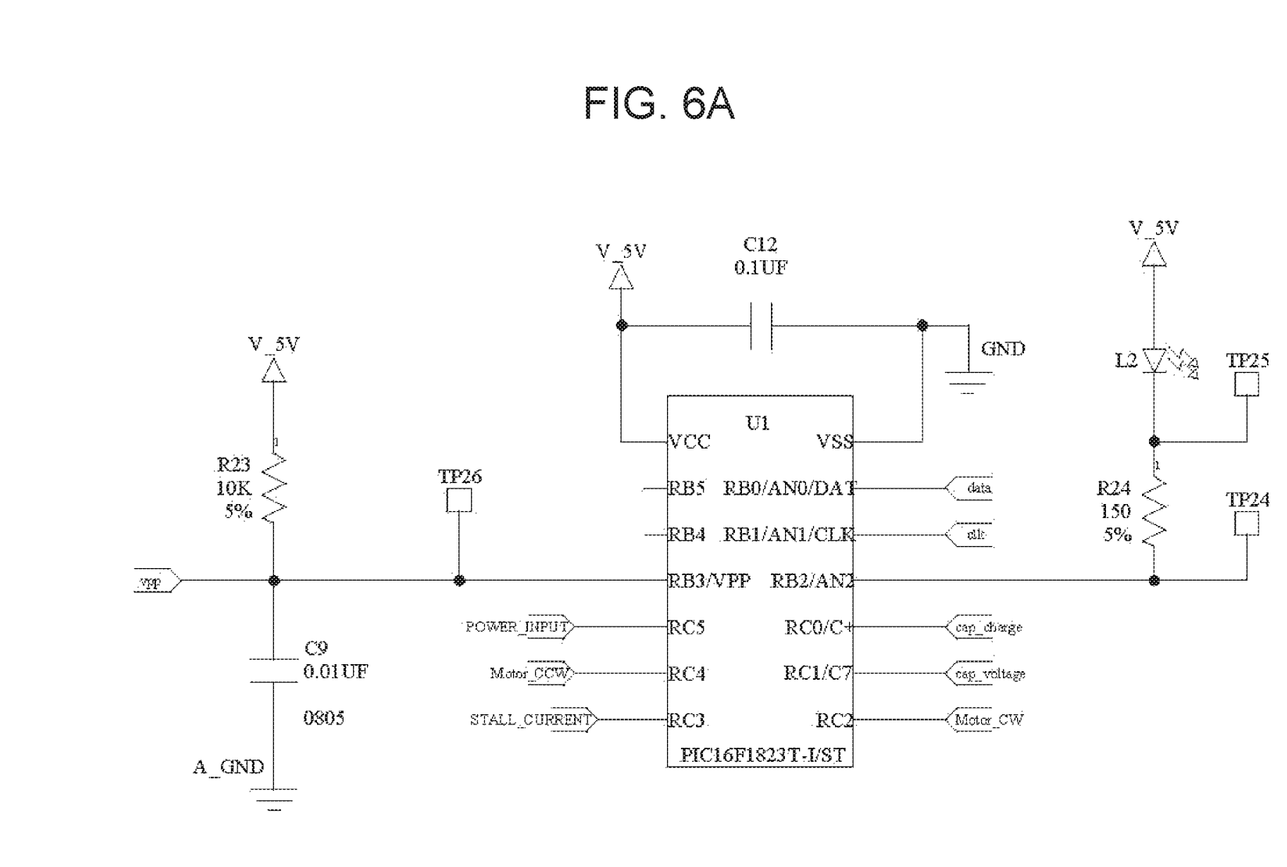
FIG. 6A is a diagrammatic sketch showing the top of the electronic circuit board with the various parts showing in diagrammatic outline.
Figure 6B:
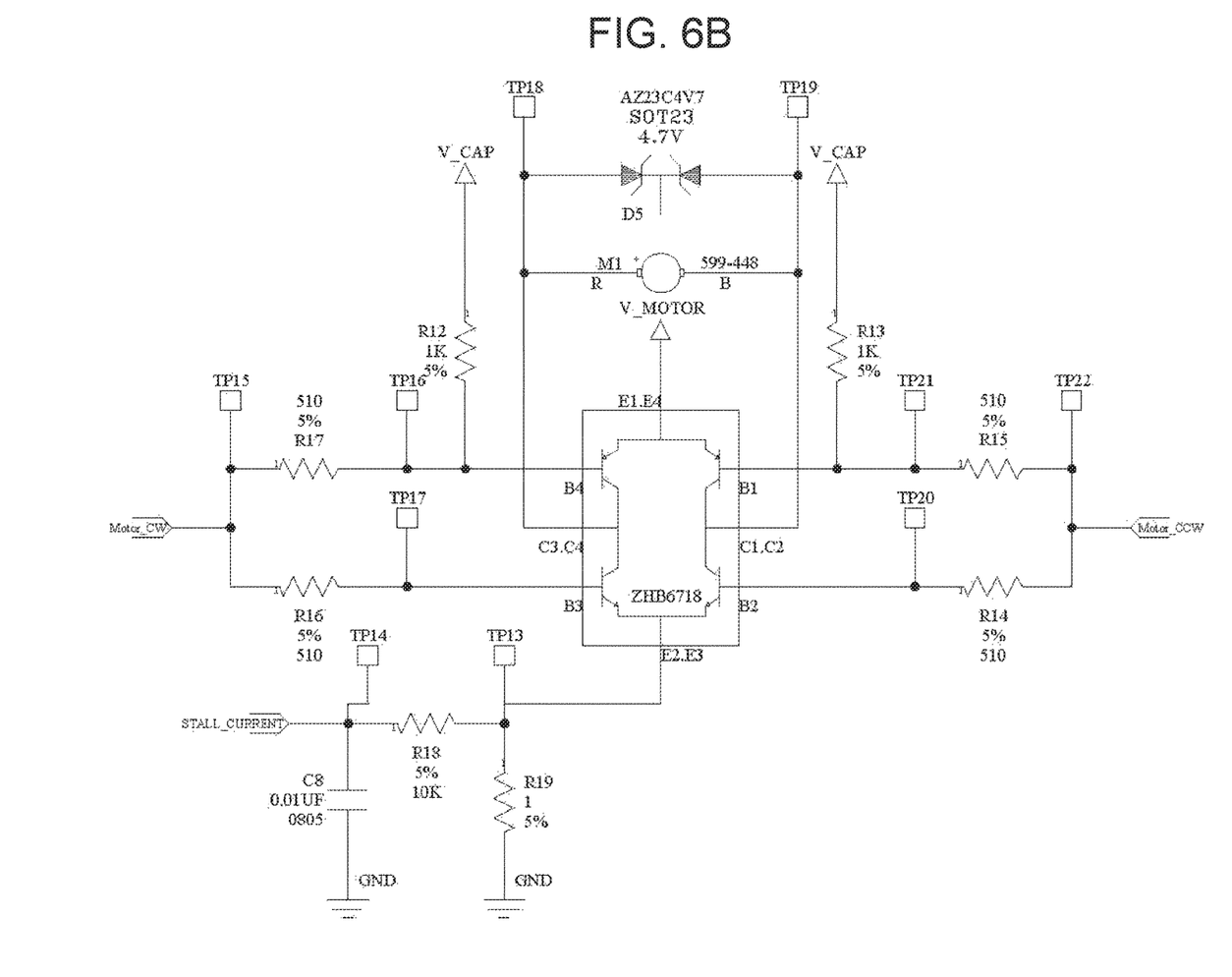
FIG. 6B includes electronic circuit diagrams showing the layout of the power capacitors and the motor, and the polarity reversal circuit for driving the motor to open and close the valve, respectively.

Persons of ordinary skill in the art of controlling electrical systems will recognize that there are many possible control mechanisms to switch the motor 8 on and off and to control the direction of rotation of the motor. In the present example shown in the drawings herewith it is a combination of a mechanical gear train system 20, 6, 4, 7 and 5 and the electronic controller system shown in FIGS. 6A and 6B, and a sensor, not shown. A thermostatic sensor located in the system zone, and not shown, is connected to the electronic system of the present drawings. The microchip U1, in FIG. 6A, is programmed to provide power to the motor upon receipt of a signal from the sensor, so that when the valve is in the opened position, to cause the valve to close, and when the valve is closed to cause the motor to open the valve, as explained below. Examples of the various elements that can be used to form one embodiment of the electronic control system for the present invention are depicted in the drawings. It should be understood that one skilled in the art can utilize other circuitry to achieve the same control over the valve. The circuitry for this embodiment contains the elements identified as follows:

TABLE 1

| Reference Designation | Quantity | DESCRIPTION |
|---|---|---|
| C1, C7 | 2 | CAP ELECTROLITIC, RAD, 8 MM, 6.0 F, 2.5 V |
| C11 | 1 | CAP ELECTROLITIC RAD, 8 MM, 470 UF, 16 V, 20% |
| C2, C14 | 2 | CAP ELECTROLITIC, SMT 10 MM × 13.5 MM, 5.6 UF, |
| C3 | 1 | CAP TANTALUM 4.7 UF 10 V 20% SMD |
| C4, C12, C13 | 3 | CAP .1 UF 50 V CERAMIC X7R 0603 |
| C5, C10 | 2 | CAP CERAMIC 1000 PF 50 V NP0 0603 |
| C6 | 1 | CAP ELECTROLITIC, LOW ERS, SMT 4 MM, 10 UF, 16 V, 20% |
| C8, C9 | 2 | CAP CERAMIC CHIP, 0603, .01 UF, 50 V, 10% |
| D1, D8 | 2 | SCHOTTKY DIODE, SOD323, 33 mv@ 2 mA |
| D2 | 1 | RECTIFIER DIODE, SMA, 400 V, 1 A |
| D3 | 1 | ZENER DIODE, SOD323, 5.1 V, 200 mW |
| D4 | 1 | ZENER DIODE, SOD323, 2.0 V, 200 mW |
| D5 | 1 | DUAL ZENER COMMON CATHODE, S0T23, 4.7 V |
| D6 | 1 | RECTIFIER DIODE, SUPER FAST, 600 V, 1 A, Tr = 35 nsec |
| D7 | 1 | RECTIFIER DIODE, SMA, 100 V, 1 A |
| G1 | 1 | BRIDGE RECTIFIER, HD-T, MINIDIP, 0.8 A, 600 V |
| L1 | 1 | INDUCTOR, 680 uH, 400 MA, 1.6 OHM, RAD |
| L2 | 1 | LED T-1¾, RT ANGLE, GREEN, FLAT BACK |
| L3 | 1 | INDUCTOR, SHIELDED, 680 UH, 0.2 A, 1.48 OHM |
| M1 | 1 | MOTOR ASSEMBLY, 5 VDC MOTOR & GEAR |
| Q1 | 1 | PNP TRANSISTOR −25 V −2 A SOT89 |
| Q2 | 1 | PNP TRANSISTOR, SOT23, −60 V, −600 MA |
| Q3 | 1 | NPN TRANSISTOR, SOT23, 40 V, 600 MA |
| R1 | 1 | RES 2.10K OHM 1/10 W 1% 0603 SMD |
| R14, R15, R16, R17 | 4 | RESISTOR CHIP, TKF, 0603, 510, 5% |
| R18, R23 | 2 | RES 10K OHM 1/10 W 5% 0603 SMD |
| R19 | 1 | RES 1.0 OHM 1/10 W 1% 0603 SMD |
| R2 | 1 | RESISTOR, METAL OXIDE, 2 W, 7.5, 5% |
| R24 | 1 | RES 150 OHM 1/10 W 5% 0603 SMD |
| R25 | 1 | RESISTOR, 3 W, 47, FUSIBLE, FLAMEPROOF |
| R3, R7, R8, R9, R10, R12, R13, R21 | 8 | RESISTOR CHIP, TKF, 0603, 1K, 5% |
| R4, R5, R11, R20 | 4 | RESISTOR CHIP, TKF, 0603, 100K, 5% |
| R6 | 1 | RESISTOR CHIP, 10K, 1%, 1/10 W 0603 |
| T1 | 1 | WIRE, 18 GA, BLACK, w/MOLEX5298-TTERMINAL; 7.5" |
| T2 | 1 | WIRE, 18 GA, WHITE, w/MOLEX5298-TERMINAL; 7.5" |

TABLE 1-continued

| Reference Designation | Quantity | DESCRIPTION |
| --- | --- | --- |
| U1 | 1 | IC MCU PIC FLASH 4K × 14 TSSOP14 T&R |
| U2 | 1 | H-BRIDGE TRANSISTOR, 20 V, LOW Vce, 2.5a |
| U3 | 1 | SWITCHING REGULATOR, 265 VAC OUT-245 MA 12 VDC |
| U4 | 1 | VOLTAGE REGULATOR, 5 VOLT, 3PIN, SO08NB |
| U5 | 1 | SINGLE SUPPLY OPAMP, RAIL TO RAIL OUTPUT |
| 400 | 1 | PRINTED CIRCUIT BOARD, REVF |
| 2 | 1 | BOTTOM HOUSING, REV- |
| 4 | 2 | VERSAFIT HEAT SHRINK TUBE, 9.5 mm × 19.1 mm LONG |
| 3 | 1 | POTTING MATERIAL |

In the example shown, when a particular zone in a building that is being heated in winter or cooled in the summer reaches an uncomfortable temperature, the heating or cooling fluid sent to the pipes in that zone is allowed to flow by the opening of the high voltage zone sentry valve 15, or halted if it is heated or cooled too much, for that particular zone. The power is brought from the AC outlet which here in the United States is generally 120 Volts and 60 Hz, although it can also be utilized in Europe where the voltage can be 240 Volts and 50 Hz.

The current from the AC outlet is passed through a rectifier and a switching power supply which will bring the voltage down to 10 Volts DC and then through a regulator to a voltage of 5 Volts DC, which direct current is provided to the control electronics. The 10 VDC is used to charge the storage capacitors C1 and C7 (each of which is preferably in this embodiment rated at 2.5 Volts and 6 Farads) to a level of 5 VDC. Once the capacitors have been charged, the 5 Volts stored in the capacitors can be used to power the motor 8, to open the zone sentry valve 15. While AC power is presented to the valve system, the charge of the two power capacitors, C1 and C7, is maintained at the desired 5 VDC value.

The power train from the motor is transmitted through the shaft 8 rigidly connected to a gear 20 which in turn moves the gear 6 and that in turn operates the gear 7 to move the sector gear 5 which is connected to shaft 4 and thus move the valve to permit or to close off the fluid flow. After the valve is opened, when the zone reaches its desired temperature, as set on a thermostatic sensor, a signal is then sent to the microchip U1 which connects the two capacitors to the motor 8, to provide the power to the motor to turn the shaft 8 in a reverse direction, as the polarity is reversed, turning gear 6 in the reverse direction which in turn causes the gear 7 to turn and moves the sector gear 5 which is connected to shaft 4 so as to turn the valve spindle 22 in the reverse direction to the closed position. When the valve is fully opened or closed, the current through the motor increases to the "stall current" which registers with an ammeter in the circuit board, opening the circuit and shutting off the motor. There is then no current flow in the motor until it is desired again to power up the motor to move the valve back to its previous open or closed position. By providing the capability to reverse the polarity of current flowing to power the motor, and to thus reverse the direction of moving the gear train to move the valve in the reverse direction in accordance with the rotational direction of the motor spindle, the same motor can be used to both open and close the valve, while allowing the motor to be turned off during the intervals that the valve is in its fully closed or open positions.

In some instances, the zone valve is originally in the open position. In that case, the initial closing continues until the valve reaches a terminal position of closure when it can turn no further. At that point the valve motor is subject to a "stall current" which is registered by the electronic system as a signal to open the circuit from the power source and stop the operation of the motor. The power capacitors C1, C7 should have been fully charged prior to starting the motor and the charge maintained once the motor is stopped at which time the system should be in a charged and at rest situation. The microprocessor U1 may be programmed, e.g., in accordance with the flow chart of FIG. 7.

Figure 7:
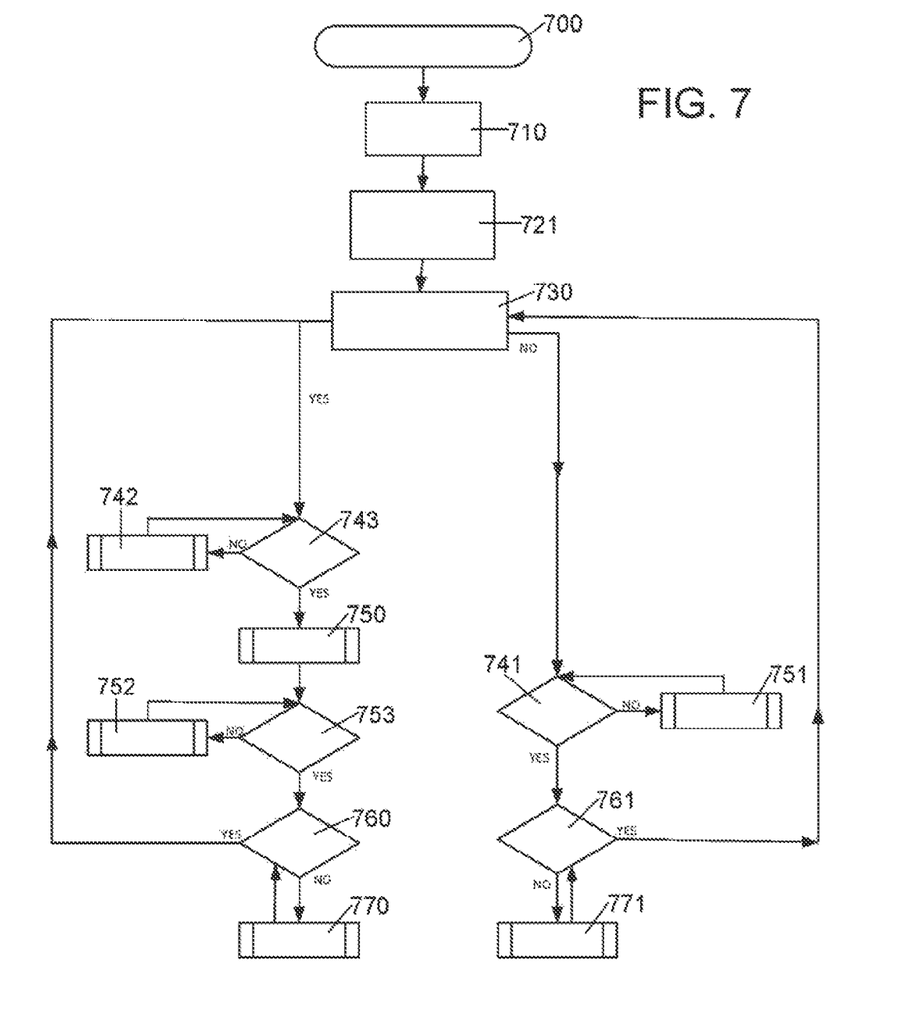
FIG. 7 is a flow diagram for the operation of the high voltage zone sentry valve programmed into the microchip data processor in the valve control system housing.

The steps of the exemplary algorithm shown in FIG. 7 comprise a first step to "Power up system" 700. The second step is to "initialize system" 710, followed by the instruction to "check temperature of zone" 721, and then querying "is zone outside of comfort zone" 730, which is a preset temperature.

If the zone is outside of the comfort range so that the answer to the question 730 is "no", the system next queries "is the valve fully closed 741". If "no" the system is instructed to "run motor CCW" 751; if the answer to "is valve fully closed?" is "yes", the next inquiry is "is motor stopped" 761. If "yes", the system returns to the query "is zone outside of comfort range" 730; if "no", so that the motor is not stopped, the system is next instructed to "stop the motor" 771. The query "is motor stopped" is repeated and if the response is "yes", the system returns to the query "is zone outside of comfort range" 730.

If the answer to the question "is zone outside of comfort range?" is "yes", the next inquiry 743 is "is capacitor charged?" If the answer to that is "no", the next instruction is to "charge capacitors" 742. If the answer to "is capacitor charged?" is "yes", the following instruction 750 is to "stop charging capacitors". In this line of the algorithm, the next question 753 is "is valve fully open?" If the answer is "no", the instruction 752 is "run motor CCW". If the answer to "is valve fully open"?" 753 is "Yes", the next query is "is motor stopped?" 760. If the answer is "no", the next instruction is "stop motor" 770. If the answer to the query "is motor stopped?" 760 is "yes", the algorithm returns to the opening query "is zone outside of comfort range?" 730.

This algorithm as exemplified by FIG. 7, can be modified to achieve the same results when operating the system, in accordance with well-known parameters. The precise algorithm used is not an essential element of this invention.

Figure 8:
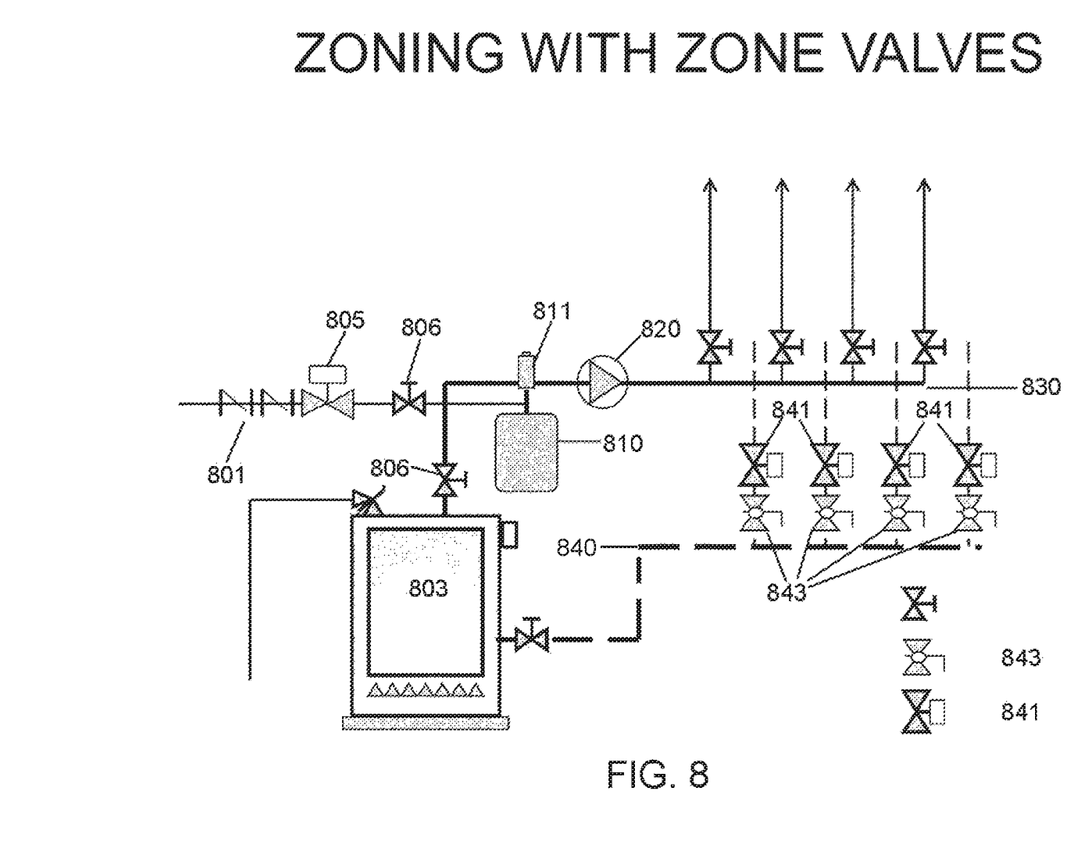
FIG. 8 is one example of a heating system for a multiple unit building showing the zone sentry valve coming off from the main heating fluid line from and returning to a boiler.
Figure 9:
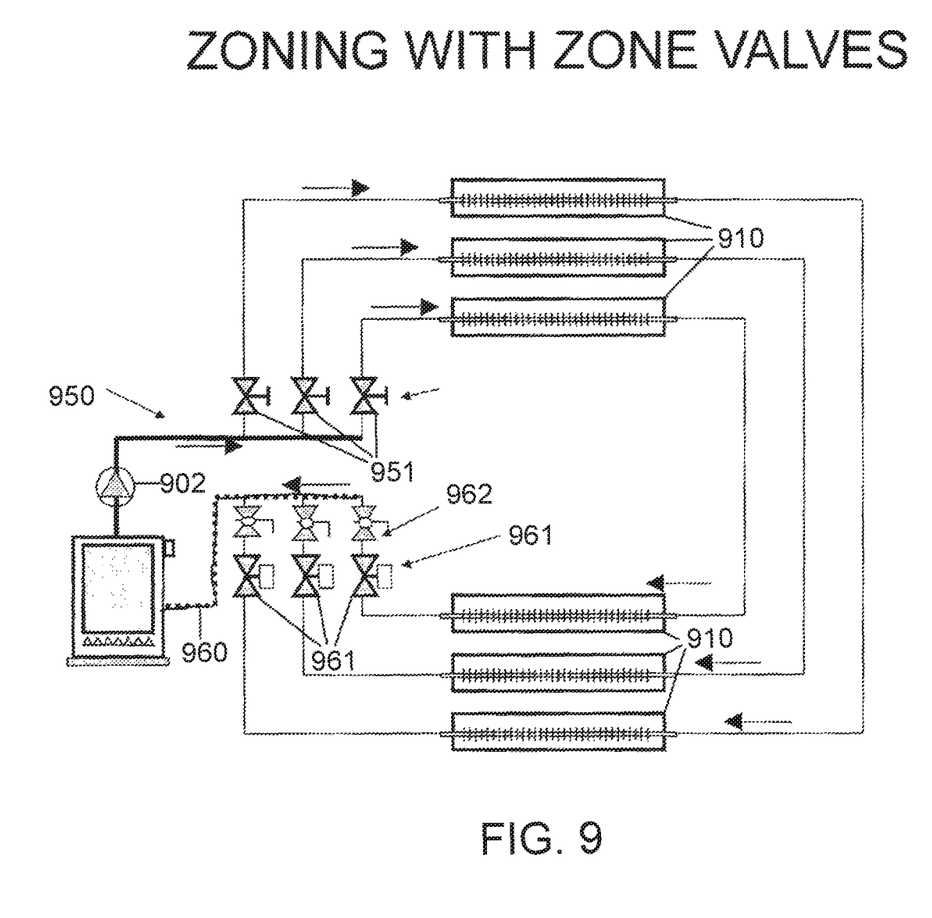
FIG. 9 is another example of a heating system showing the individual heat radiating units connected to the boiler through a series of zone control valves separating and controlling each zone separately.

FIGS. 8 and 9 show two different HVAC systems utilizing the zone valves of the present invention. The systems shown are heating systems, by way of example only, the heated fluid being obtained from a central boiler and then distributed through headers to maintain the desired temperature in each zone, controlled by a zone valve of the present invention. However, these same systems can be used for distributing any temperature-changing fluid, whether the system is for heating based upon hot water or steam obtained from a boiler, or for cooling where a cooling fluid is obtained from a central air conditioning unit operating in a well-known manner.

In either case the fluid passes from the boiler or cooler into a supply header 830 in FIGS. 8 and 950 in FIG. 9. A combination of isolation valves 831 in FIGS. 8 and 951 in FIG. 9 allow for the passage of the HVAC fluid to the separate zones. Similarly, on the return header 840 in FIGS. 8 and 960 in FIG. 9 a combination of the motorized zone valves of the present invention 961 (FIG. 9), 841 (FIG. 8) and balance valves 962 (FIG. 9), 843 (FIG. 8) (well-known in the art), are utilized for further control. In all of these cases the systems utilize the zone valves to provide the automatic control so as to separately maintain a desired temperature in each zone of a multiunit structure.

FIG. 8 includes an air removal device 811 and an expansion tank 810, and further controls utilizing an isolation valve 806, a PRV valve 805 and a backflow preventer between the air removal device 811 and the expansion tank 810. Similarly, another isolation valve is included immediately exiting from the boiler to provide further control. Each zone includes an isolation valve 831 a motorized zone valve 841 and a balance valve 843 to achieve the desired flexibility and control in operating the system.

In FIG. 9, HVAC fluid, heated water from a boiler 903, is moved by pump 902 to the supply header 950 which includes isolation valves 951 leading to the individual zone heaters 910 in the system. The control over the flow into the individual zones is automatically achieved utilizing the zone valves 961 of the present invention coupled with balancing valves 962 returning to the boiler through the return header 960. As stated before, each of these systems can be operated using either heating or cooling fluid depending upon the time of year and the desired temperature effect required.

The electronic controller system of this invention can also be used to maintain other conditions in addition to temperature, such as humidity, i.e., the concentration of a vapor in an atmosphere, in both liquid and gaseous environments, concentrations of reagents in liquid or gaseous systems, or multistate systems, such as maintaining a level of a moving liquid through a gaseous container. Generally, wherever a closed zone must be controlled, for a specific condition, this type of system can be utilized.

Upon receiving a signal from the, sensor, e.g., a thermostat, that the zone is not at a desired condition, such as temperature that is too warm or too cold, depending upon whether the system is a heater or an air cooler, the microchip closes a circuit between the power capacitors and the motor discharging the capacitors and causing the motor to turn in an opposite direction from the closing so as to move the valve to the open position and permit flow of the temperature changing fluid.

It is clear that the present invention is designed to overcome the drawbacks and deficiencies existing in the prior art by way of providing more efficient use of energy and to avoid problems with regard to a spring becoming worn, and losing its elasticity. The invention provides a system that can utilize a range of AC power sources, anywhere from 90 Volts to 277 Volts and a frequency of from 45 to 65 Hz.

While particular embodiments of the invention have been shown, it will be understood that the invention is not limited thereto since modifications may be made by those skilled in the art especially in light of the foregoing teachings. Reasonable variation and modification are possible within the scope of the invention, which is set out in the claims.

What is claimed is:

1. A high-voltage zone valve control system for a valve that is capable of being opened and closed to flow to an external zone, the control system comprising:
   (a) a brushed, direct current rotary electric motor operably connected to the valve to control opening and closing the valve;
   (b) two sources of DC current connected to the electric motor, the polarity of the DC current determining the direction of rotation of an output shaft of the electric motor;
   (c) an electronic control system comprising a microprocessor for controlling the connection between the electric motor and the two sources of DC current, and
   (d) an electric measuring device capable of
       measuring the electric current flow to the electric motor, and
       sending a first electrical signal to the microprocessor when a predetermined current value is measured;
   wherein the two sources of DC current comprise;
       an external source of DC current, and
       a rechargeable electrical storage system having a total storage capacity sufficient to power the electric motor to fully open or fully close the valve and being capable of receiving and storing DC current and discharging said stored DC current to the electric motor with a polarity reversed from the polarity of the external source of DC current;
   further wherein the microprocessor is capable of
       receiving and processing a second electrical signal from an external sensor for signaling when a desired condition exists in the external zone,
       receiving and processing the first electrical signal from the electric measuring device for signaling that a predetermined electrical stall current is flowing to the electric motor, thus indicating that the valve is at its fully open or fully closed position and cannot move farther, and
       controlling the flow and polarity of DC current to the electric motor when the second electrical signal is received from the external sensor indicating that a desired condition does not exist in the external zone, in order to
       cause the valve to move in a first direction and thus open the valve to change the condition in the zone by allowing flow through the valve, or
       reverse the polarity of the current upon receiving the second signal that the desired condition exists in the external zone, so as to cause the motor to cause the valve to move in the reverse direction to close the valve and thus discontinue changing the condition in the external zone;
   wherein the electric measuring device is capable of measuring a stall current arising when the valve shaft is mechanically stopped from moving further when the motor is powered to turn, and to send a signal to the microprocessor that the stall current is detected, and the microprocessor is configured to send a signal to shut off the power to the system when such stall current is detected, at the fully open or fully closed position of the valve, to stop current flow to the motor, such that electrical power is not provided to the motor when the valve is in the full opened or full closed position; and power is directed to the storage system to charge the system to store electrical energy.

2. The high-voltage zone valve control system of claim 1, wherein
the external source of DC current comprises a rectifier and a regulator to convert and regulate available external AC voltage to the desired DC voltage output;
the microprocessor being capable of controlling the flow and polarity of DC current to the rechargeable electrical storage system from the regulator and rectifier, when the second electrical signal is received from the external sensor that a predetermined condition, does not exist or, exists in the external zone in order to move the valve in a first direction to open the valve to change the condition in the zone, or to reverse the polarity of the current upon receiving a signal that the desired condition exists in the external zone, so as to cause the motor to move the valve in the reverse direction to close the valve; or when the first electrical signal is received from the electric measuring device indicating the stall current is flowing to the motor, to shut off the current flow to the motor;
whereby the electronic control system controls movement of the valve mechanically connected to the output shaft of the motor to close or open a valve to maintain a desired predetermined condition in the external zone.

3. The high voltage zone valve control system of claim 1, wherein the external sensor is a thermostatic sensor measuring the temperature in the external zone.

4. The high voltage zone valve control system of claim 1 wherein the electric measuring device is an ammeter.

5. The high voltage zone valve control system of claim 1, further comprising a train of gears operatively connected between the output shaft and the valve shaft and configured to cause rotation of the valve between a valve open position and a valve closed position upon rotation of the output shaft, the direction of rotation of the output shaft being determined by the polarity of the DC current powering the motor.

6. The high voltage zone valve control system of claim 5, wherein the angular range of motion is limited by the train of gears.

7. The high voltage zone valve control system of claim 1, wherein the direct current powering the motor has a voltage of between 4 and 10 volts DC and the storage system comprises storage capacitors capable of storing at least about 6 Farads of electrical charge, at 2.5 Volts.

8. The high voltage zone valve control system of claim 1 wherein the programmable electronic circuit is configured to provide direct current electric power to the electric motor, the programmable electronic circuit comprises a rectifier and a regulator to convert and regulate external AC voltage to a desired DC power output, the at least one electrical power storage system comprising at least one storage capacitor;
the external sensor is configured to measure the temperature of the external zone, the temperature of which is to be controlled by either a cooling fluid or a heating fluid passing through the zone valve, the temperature sensor being capable of sending a signal to the electronic circuit when the temperature in a zone needs to be changed by causing the fluid to flow through the valve, and when it is at the desired preset temperature, and the fluid flow is to be halted; the electronic circuit is further capable of providing direct current electrical energy to the at least one storage capacitor, and the electric measuring device is an ammeter so set as to open the electrical circuit to the motor when the ammeter senses that the stall current is flowing indicating that the valve has reached its fully open or fully closed position and is not able to move.

9. The high voltage zone valve control system of claim 8; wherein the external source of alternating electric current power supplied to the electronic system can have a voltage of between 90 and 277 VAC, at 45 to 65 Hz; the at least one electrical power storage system comprising at least one storage capacitor, or at least one rechargeable battery, the temperature sensor being a thermostatic sensor located in a zone the temperature of which is to be controlled by the fluid passing through the zone valve, the temperature sensor being capable of sending a signal to the electronic circuit when the temperature in a zone needs to be changed to meet the preset value or when the preset value is met, so that no further fluid flow is required;
the electronic circuit is configured to provide direct current electrical power to the storage system at a voltage of between 4 and 10 VDC; and the storage system when fully charged is capable of providing DC current at a voltage of at least 5 VDC to the motor at an opposite polarity from the current supplied directly to the motor by the electronic circuit, to move the valve between the closed and opened positions; and the signal from the ammeter is so set as to open the electrical circuit to the motor when the ammeter senses that the stall current is flowing indicating that the valve has reached its fully open or fully closed position and is not able to move further.

\* \* \* \* \*